United States Patent
Couture et al.

(10) Patent No.: US 11,982,189 B2
(45) Date of Patent: May 14, 2024

(54) WARM START CONTROL OF AN ACTIVE CLEARANCE CONTROL FOR A GAS TURBINE ENGINE

(71) Applicant: Raytheon Technologies Corporation, Farmington, CT (US)

(72) Inventors: Patrick D. Couture, Tolland, CT (US); Norman Cleesattel, Zorneding (DE)

(73) Assignees: RTX CORPORATION, Farmington, CT (US); MTU Aero Engines AG, Munich (DE)

( * ) Notice: Subject to any disclaimer, the term of this patent is extended or adjusted under 35 U.S.C. 154(b) by 0 days.

(21) Appl. No.: 17/339,604

(22) Filed: Jun. 4, 2021

(65) Prior Publication Data
US 2022/0389828 A1  Dec. 8, 2022

(51) Int. Cl.
*F01D 11/20* (2006.01)
*F02C 9/00* (2006.01)

(52) U.S. Cl.
CPC .............. *F01D 11/20* (2013.01); *F02C 9/00* (2013.01); *F05D 2220/32* (2013.01); *F05D 2270/01* (2013.01)

(58) Field of Classification Search
CPC .......... F01D 11/20; F01D 11/24; F01D 11/22; F01D 11/14; F01D 11/16; F05D 2220/32; F05D 2270/01; F02C 9/00
See application file for complete search history.

(56) References Cited

U.S. PATENT DOCUMENTS

| | | | |
|---|---|---|---|
| 4,849,895 A | | 7/1989 | Kervistin |
| 4,928,240 A | * | 5/1990 | Davison ................ F01D 11/24 60/806 |
| 5,012,420 A | * | 4/1991 | Walker ................ F01D 11/24 415/118 |
| 5,076,050 A | | 12/1991 | Schwarz et al. |
| 6,401,460 B1 | * | 6/2002 | Xia ........................ F01D 11/24 415/176 |

(Continued)

OTHER PUBLICATIONS

EP Search Report for Application No. 22176854.2-1004/4108886; dated Mar. 23, 2023 6 pages.

*Primary Examiner* — Juan G Flores
*Assistant Examiner* — Eric A Lange
(74) *Attorney, Agent, or Firm* — CANTOR COLBURN LLP (57) ABSTRACT

According to an aspect, a gas turbine engine includes a turbine section with a turbine case and a plurality of turbine blades within the turbine case. The gas turbine engine also includes an active clearance control system with an active clearance control cooling air supply, a valve pneumatically coupled to the active clearance control cooling air supply, and a controller. The controller is configured to determine an active cooling control schedule adjustment based on a condition of the gas turbine engine, operate the active clearance control system according to an active cooling control schedule as modified by the active cooling control schedule adjustment, apply a decay function to the active cooling control schedule adjustment to reduce an effect on the active cooling control schedule adjustment, and resume operating the active clearance control system according to the active cooling control schedule based on an active cooling control condition being met.

15 Claims, 4 Drawing Sheets

(56) References Cited

U.S. PATENT DOCUMENTS

| | | |
|---|---|---|
| 7,434,402 B2 | 10/2008 | Paprotna et al. |
| 7,584,618 B2 | 9/2009 | Amiot et al. |
| 9,353,641 B2 | 5/2016 | Philippot |
| 9,909,441 B2 | 3/2018 | Schelfaut |
| 10,066,630 B2 | 9/2018 | Kumar et al. |
| 2009/0319150 A1 | 12/2009 | Plunkett et al. |
| 2012/0167584 A1 | 7/2012 | Philippot |
| 2012/0210724 A1 | 8/2012 | Flanagan |
| 2013/0177414 A1 | 7/2013 | Bonneau et al. |
| 2013/0323016 A1 | 12/2013 | Javelot et al. |
| 2021/0017913 A1 | 1/2021 | Auriol |

\* cited by examiner

WARM START CONTROL OF AN ACTIVE CLEARANCE CONTROL FOR A GAS TURBINE ENGINE

BACKGROUND

Exemplary embodiments of the present disclosure pertain to the art of gas turbine engines, and more particularly, to warm start control of an active clearance control for a gas turbine engine.

Gas turbine engines generally include a compressor to pressurize airflow, a combustor to burn a hydrocarbon fuel in the presence of the pressurized airflow, and a turbine to extract energy from the resultant combustion gases. The compressor and the turbine each include rotatable blades and stationary vane arrays. The outermost tips of each rotatable blade are positioned in close proximity to a shroud assembly. To facilitate engine performance, it is operationally advantageous to maintain a small radial tip clearance through the various engine operational conditions. Clearances are typically desired to have a larger margin during a climb segment of flight.

BRIEF DESCRIPTION

Disclosed is a gas turbine engine that includes a turbine section with a turbine case and a plurality of turbine blades within the turbine case. The gas turbine engine also includes an active clearance control system with an active clearance control cooling air supply, a valve pneumatically coupled to the active clearance control cooling air supply, and a controller. The controller is configured to determine an active cooling control schedule adjustment based on a condition of the gas turbine engine, operate the active clearance control system according to an active cooling control schedule as modified by the active cooling control schedule adjustment, apply a decay function to the active cooling control schedule adjustment to reduce an effect on of the active cooling control schedule adjustment with respect to the active cooling control schedule, and resume operating the active clearance control system according to the active cooling control schedule based on an active cooling control condition being met.

In addition to one or more of the features described above, or as an alternative to any of the foregoing embodiments, the condition of the gas turbine engine can be determined based on an elapsed time from a previous shutdown to starting the gas turbine engine or corresponds to the elapsed time from the previous shutdown to starting the gas turbine engine.

In addition to one or more of the features described above, or as an alternative to any of the foregoing embodiments, the condition of the gas turbine engine can be further determined based on a time since the gas turbine engine was started to a current time.

In addition to one or more of the features described above, or as an alternative to any of the foregoing embodiments, the condition of the gas turbine engine can be a starting temperature condition.

In addition to one or more of the features described above, or as an alternative to any of the foregoing embodiments, the starting temperature condition can be based on determining an ambient temperature.

In addition to one or more of the features described above, or as an alternative to any of the foregoing embodiments, the controller can be configured to control a state of the valve to a selectively deliver a cooling airflow to the active clearance control cooling air supply.

In addition to one or more of the features described above, or as an alternative to any of the foregoing embodiments, the decay function can fade a modification effect on the active cooling control schedule by the active cooling control schedule adjustment over a period of time.

In addition to one or more of the features described above, or as an alternative to any of the foregoing embodiments, the active cooling control schedule adjustment can operate the active clearance control system after engine start through takeoff and climb.

In addition to one or more of the features described above, or as an alternative to any of the foregoing embodiments, the active cooling control schedule adjustment can operate the valve to reduce a clearance between the turbine blades and the turbine case during takeoff and climb.

Also disclosed is a method that includes determining an active cooling control schedule adjustment of an active clearance control system based on a condition of a gas turbine engine. The active clearance control system is operated according to an active cooling control schedule as modified by the active cooling control schedule adjustment. A decay function is applied to the active cooling control schedule adjustment to reduce an effect of the active cooling control schedule adjustment with respect to the active cooling control schedule. Operation of the active clearance control system is resumed according to the active cooling control schedule based on an active cooling control condition being met.

In addition to one or more of the features described above, or as an alternative to any of the foregoing embodiments, the method can include controlling a state of a valve to a selectively deliver a cooling airflow to an active clearance control cooling air supply of an active clearance control system proximate to a turbine case of the gas turbine engine.

Also disclosed is an active clearance control system that includes an active clearance control cooling air supply, a valve pneumatically coupled to the active clearance control cooling air supply, and a controller. The controller is configured to determine an active cooling control schedule adjustment, operate the active clearance control system according to an active cooling control schedule as modified by the active cooling control schedule adjustment, apply a decay function to the active cooling control schedule adjustment to reduce an effect of the active cooling control schedule adjustment with respect to the active cooling control schedule, and resume operating the active clearance control system according to the active cooling control schedule based on an active cooling control condition being met.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
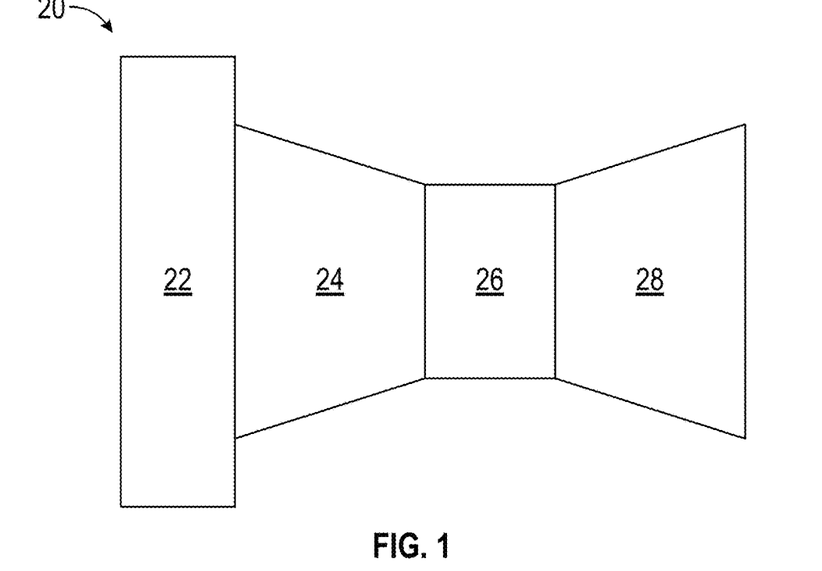
FIG. 1 is a schematic diagram of a gas turbine engine, in accordance with an embodiment of the disclosure.

FIG. 1 schematically illustrates a gas turbine engine 20. The gas turbine engine 20 is disclosed herein as a turbofan that generally incorporates a fan section 22, a compressor section 24, a combustor section 26, and a turbine section 28. The fan section 22 drives air along a bypass flow path while the compressor section 24 drives air along a core flow path for compression and communication into the combustor section 26 then expansion through the turbine section 28. The gas turbine engine 20 can include multiple spools (not depicted) that mechanically link portions of the compressor section 24 with the turbine section 28, such as a low spool and a high spool. Combustion of fuel in the combustor section 26 can result in high operational temperatures within the turbine section 28. While the example of FIG. 1 illustrates one example of the gas turbine engine 20, it will be understood that the systems further described herein can be incorporated in a variety of turbomachinery configurations.

Figure 2:
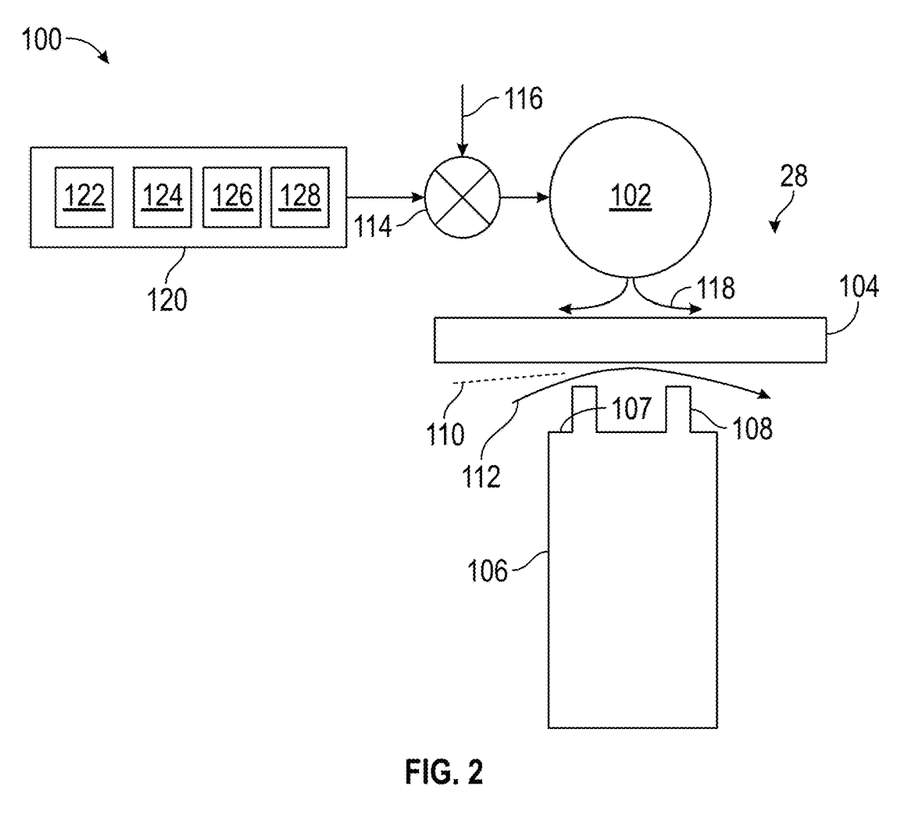
FIG. 2 is a schematic diagram of an active clearance control system, in accordance with an embodiment of the disclosure.

FIG. 2 is a schematic diagram of an active clearance control system 100 that can be used in conjunction with the gas turbine engine 20 of FIG. 1. The active clearance control system 100 can include an active clearance control cooling air supply 102 proximate to a turbine case 104 of the turbine section 28 of FIG. 1. The turbine section 28 also includes a plurality of turbine blades 106 within the turbine case 104. A clearance 110 between the turbine blades 106 and the interior of the turbine case 104 establishes a leakage path 112 that can change depending on thermal conditions of the turbine case 104 relative to the turbine blades 106. In some embodiments, the turbine blades 106 can have seal fins 108 that extend from turbine blade tip 107, such that the clearance 110 is defined from a radial outer edge of the seal fins 108 to a radially inner surface of the turbine case 104. Alternatively, the seal fins 108 can be omitted, and the clearance 110 can be defined from a radial outer edge of the turbine blade tip 107 to a radially inner surface of the turbine case 104. The active clearance control cooling air supply 102 may be positioned at a portion of the turbine section 28 that corresponds to a high-pressure turbine in closer proximity to the combustor section 26, where higher pressures and temperatures typically occur during operation of the gas turbine engine 20. The active clearance control cooling air supply 102 can be a tube, panel, or other structure configured to deliver cooling air.

The active clearance control system 100 can also include a valve 114 coupled (e.g., pneumatically coupled) to the active clearance control cooling air supply 102. The valve 114 can be selectively opened and shut to allow air from an air source 116, such as cooler bypass air, to be output reaching the active clearance control cooling air supply 102. This results in a cooling flow 118 on the turbine case 104, which can actively reduce thermal expansion of the turbine case and reduce the clearance 110. Further, although a single instance of the active clearance control cooling air supply 102 and valve 114 are depicted in FIG. 2, there can be multiple instances of either or both of the active clearance control cooling air supply 102 and valve 114, for instance, aligning with multiple stages of the turbine blades 106 and/or other components of the turbine section 28. Further, there can be multiple sources of air used to provide the cooling flow 118.

A controller 120 can be part of the active clearance control system 100 and may be a dedicated control or part of an engine control, such as a full authority digital engine control (FADEC). The controller 120 can include, for example, a processing system 122, a memory system 124, an input/output interface 126, and control logic 128.

The processing system 122 can include any type or combination of central processing unit (CPU), including one or more of: a microprocessor, a digital signal processor (DSP), a microcontroller, an application specific integrated circuit (ASIC), a field programmable gate array (FPGA), or the like. The memory system 124 can store data and instructions that are executed by the processing system 122. In embodiments, the memory system 124 may include random access memory (RAM), read only memory (ROM), or other electronic, optical, magnetic, or any other computer readable medium onto which is stored data and algorithms in a non-transitory form. The input/output interface 126 is configured to collect sensor data from the one or more system sensors (not depicted), send output signals to the valve 114, and interface with various components and subsystems of the gas turbine engine 20. The controller 120 provides a means for controlling aspects of the gas turbine engine 20. The means for controlling the gas turbine engine 20 can be otherwise subdivided, distributed, or combined with other control elements (not depicted).

As one example, the controller 120 can apply control laws and access/update models to determine how to control operation of the gas turbine engine 20 and/or other aircraft components. For example, sensed and/or derived parameters related to speed, flow rate, pressure ratios, temperature, thrust, and the like can be used to establish operational schedules and transition limits to maintain efficient operation of the gas turbine engine 20. For instance, a mode of operation of the gas turbine engine 20, such as idle, takeoff, climb, cruise, and descent can have different power settings, thrust requirements, flow requirements, and temperature effects.

Control logic 128 can include instructions executable by the processing system 122 and/or circuitry to control one or more aspects of the active clearance control system 100. Under nominal operating conditions, the cooling of the turbine case 104 is typically performed during a cruise segment of flight. As heat is added during combustion of fuel in the combustor section 26 of FIG. 1, the turbine blades 106 and turbine case 104 may experience thermal growth at different rates, for example, due to differences in thermal mass and environmental differences. For longer duration flights, cruise is typically the longest flight segment, so controlling the clearance 110 to reduce leakage at the leakage path 112 can be advantageous during cruise, once thermal conditions have substantially stabilized.

Figure 3:
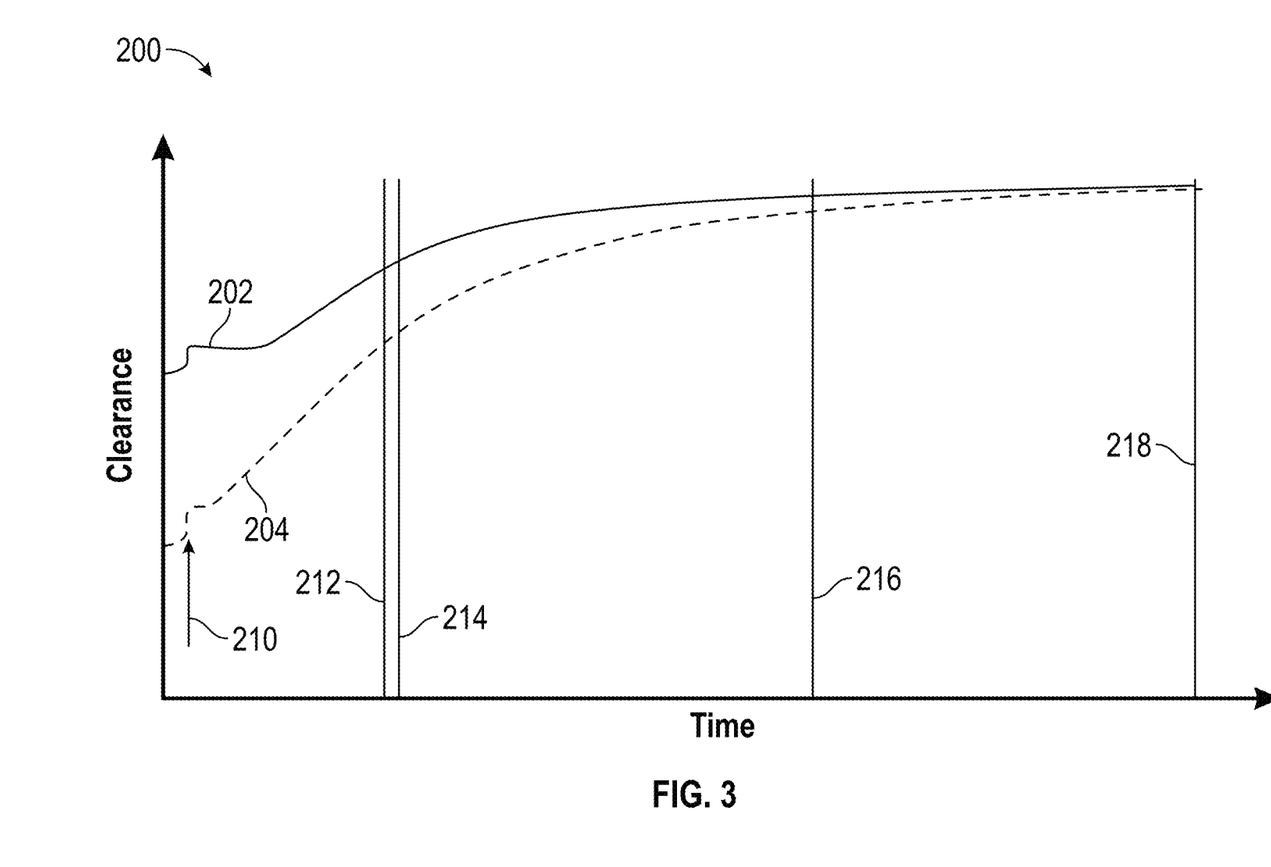
FIG. 3 is a plot of turbine tip clearance variations during operation of a gas turbine engine.

Substantial variations in starting conditions of the gas turbine engine 20 can result in different profiles of the clearance 110 relative to a flight segment. As depicted in the plot 200 of FIG. 3, turbine tip clearance variations during operation of the gas turbine engine 20 can vary between a cold-start tip clearance 202 and a warm-start tip clearance 204 without using the active clearance control system 100 of FIG. 2. In the example of FIG. 3, the cold-start tip clearance 202 and the warm-start tip clearance 204 both rise upon a start event 210 of the gas turbine engine 20 and continue to rise through the end of takeoff 212, the beginning of climb 214, and mid-climb 216 up to cruise 218. Thus, as depicted in FIG. 3, a wide range of turbine tip clearance variations can exist due to starting temperature variations when the active clearance control system 100 is not used prior to cruise 218.

Figure 4:
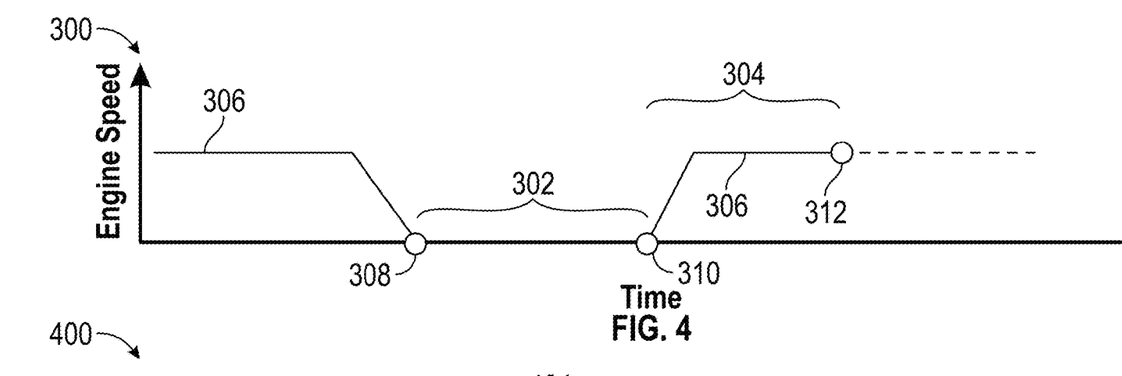
FIG. 4 is a plot of power on and off times between shutdown and operation of a gas turbine engine, in accordance with an embodiment of the disclosure.

Rather than waiting until cruise 218 to activate the active clearance control system 100, embodiments of the disclosure can detect a condition of the gas turbine engine 20 and determine a modification to an active cooling control schedule that can be stored in the memory system 124 of FIG. 1. An active cooling control schedule adjustment to the active cooling control schedule can determine when to operate the active clearance control system 100 after the start event 210 and gradually transition to the active cooling control schedule typically used during cruise 218. The active cooling control schedule adjustment can be determined by the control logic 128 of FIG. 1 based on one or more parameters. To determine a magnitude of the effect to apply through the active cooling control schedule adjustment, the control logic 128 can observe conditions, such as a power-off time 302 and a power-on time 304, as depicted in the plot 300 of FIG. 4. In the example of FIG. 4, an engine speed 306 can be monitored to determine an engine shutdown time 308 and an engine start time 310. The power-off time 302 can be computed as a difference between the engine start time 310 and the engine shutdown time 308. A current time 312 indicates a point in time where the control logic 128 is monitoring the engine speed 306 after the engine start time 310 (e.g., after a restart). The power-on time 304 can be computed as a difference between the current time 312 and the engine start time 310. A look-up table can be stored in the memory system 124 of FIG. 1 that estimates an expected reduction in heat during the power-off time 302 and an expected addition of heat during the power-on time 304 to determine a scaling factor and/or schedule modification for the active cooling control schedule adjustment. Alternatively, one or more temperature measurements can be used to determine the scaling factor and/or schedule modification for the active cooling control schedule adjustment. Further, temperature values, such as an ambient temperature, can be used to modify or determine the scaling factor and/or schedule modification for the active cooling control schedule adjustment. Various thermal models of heat transfer and thermal growth profiles of the turbine case 104 and the turbine blades 106 can be stored in the memory system 124 of FIG. 2 to support look-up operations and model computations by the control logic 128 of FIG. 2.

Figures 5, 6:
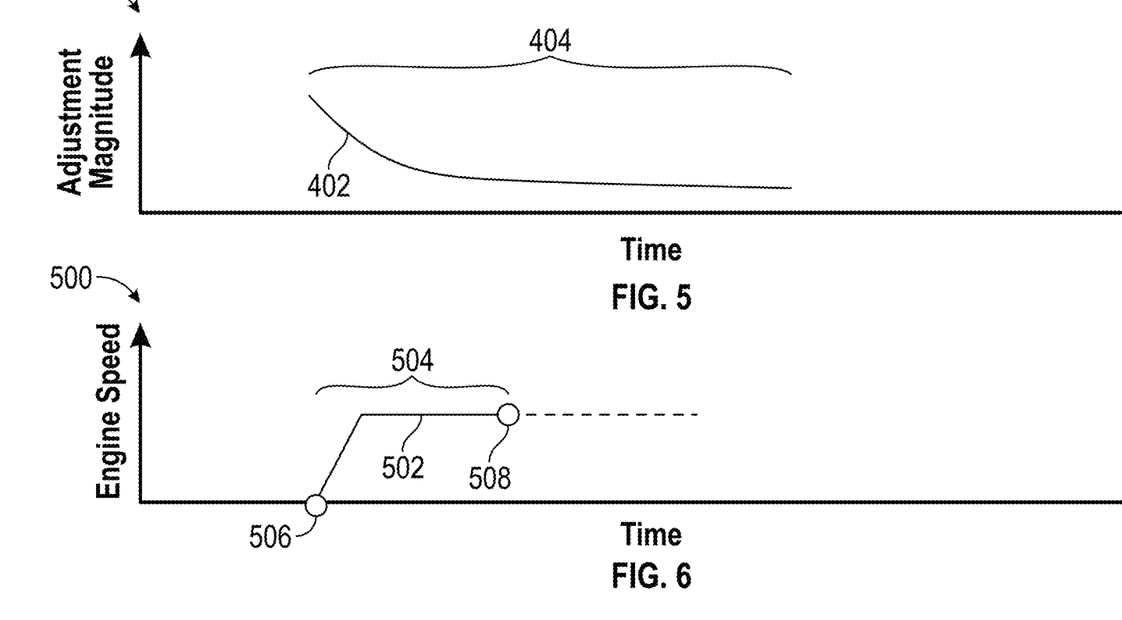
FIG. 5 is a plot of an adjustment magnitude decay for modifying an active cooling control schedule of a gas turbine engine, in accordance with an embodiment of the disclosure.
FIG. 6 is a plot of a power on time to apply an active cooling control schedule adjustment, in accordance with an embodiment of the disclosure.

To fade out the effect of the active cooling control schedule adjustment with respect to the active cooling control schedule and resume controlling the active clearance control system 100 according to the active cooling control schedule, a decay function 402 as depicted in plot 400 of FIG. 5, can be applied to the active cooling control schedule adjustment. The magnitude of adjustment to the active cooling control schedule can decay over a period of time 404. Increased lapse times can lead, due to the decay function 402, to increased cooling and/or decreased adjustment. The elapsing of the period of time 404 is one example of an active cooling control condition being met that results in resuming operation of the active clearance control system 100 according to the active cooling control schedule. A further example of an active cooling control condition being met can include a detected fault condition or pilot command that prevents use of the active cooling control schedule adjustment, such as a possible low tip clearance condition, which may be detected through vibration monitoring or other means. A yet further example of an active cooling control condition being met can include a predefined flight level being reached.

In the example of FIG. 6, a plot 500 of engine speed 502 illustrates a power-on time 504 to apply an active cooling control schedule adjustment in conjunction with the example of FIG. 5. The power-on time 504 is illustrated between an engine start time 506 and a current time 508. During this early restarting period of the power-on time 504, the adjustment magnitude of the decay function 402 can be more substantial. As compared to a later time after the power-on time 504 (as illustrated) until the period of time 404 elapses, the decay function 402 can result in a substantially reduced impact of the adjustment magnitude. The decay function 402 of FIG. 5 represents one example of how the adjustment magnitude can be modified; however, it will be understood that other curve shapes and profiles are contemplated for the decay function 402. The decay function 402 can be implemented using an equation or a mapping function, for example.

Figure 7:
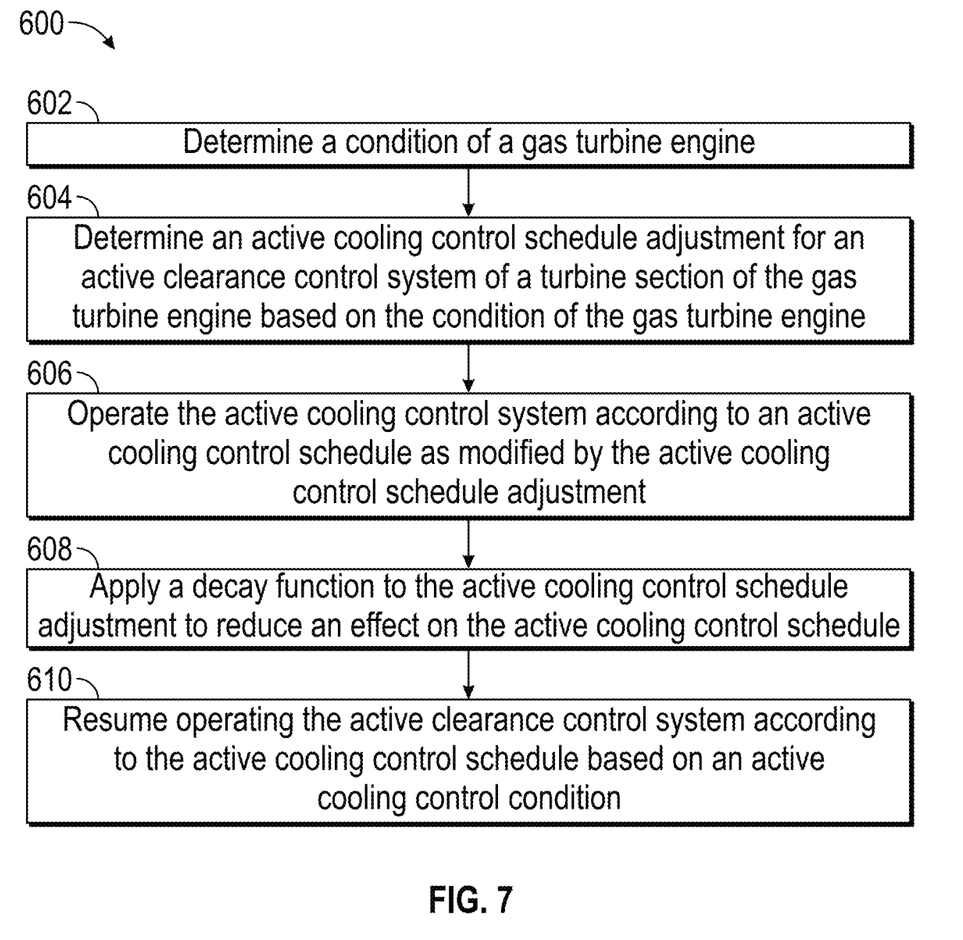
FIG. 7 is a flow chart illustrating a method, in accordance with an embodiment of the disclosure.

Referring now to FIG. 7 with continued reference to FIGS. 1-6, FIG. 7 is a flow chart illustrating a method 600 for warm start control of an active clearance control for a gas turbine engine, in accordance with an embodiment. The method 600 may be performed, for example, by the active clearance control system 100 of FIG. 2 with respect to the gas turbine engine 20 of FIG. 1. For purposes of explanation, the method 600 is described primarily with respect to the active clearance control system 100 of FIG. 2; however, it will be understood that the method 600 can be performed on other configurations (not depicted).

At block 602, the controller 120 can determine a condition of a gas turbine engine 20. The condition of the gas turbine engine 20 can be determined based on an elapsed time from a previous shutdown to starting of the gas turbine engine 20 or corresponds to the elapsed time from the previous shutdown to starting the gas turbine engine 20. For example, the power-off time 302 can be computed as a difference between the engine start time 310 and the engine shutdown time 308. The condition of the gas turbine engine 20 can be determined based on a time since the gas turbine engine 20 was started to a current time, such as the power-on time 304 computed as a difference between the current time 312 and the engine start time 310. The condition of the gas turbine engine 20 can alternatively or additionally be a starting temperature condition. The starting temperature condition can be based on determining an ambient temperature, for instance, external to the gas turbine engine 20.

At block 604, the controller 120 can determine an active cooling control schedule adjustment of an active clearance control system based on a condition of the gas turbine engine 20. For example, a table look-up operation can be performed to determine the active cooling control schedule adjustment based on the condition or a combination of conditions. The active cooling control schedule adjustment can modify a control schedule (e.g., open, shut, partially open states) of the valve 114 from a default schedule defined by the active cooling control schedule. The valve 114 can be fully opened or modulated to control delivery of the cooling flow 118 on the turbine case 104. The active cooling control schedule adjustment can account for thermal differences between the turbine case 104 and the turbine blades 106 that may occur, for instance, when a warm-start is performed. As an example, thermal growth effects on the turbine blades 106 may be reduced when a bowed rotor mitigation action is performed prior to the warm-start, but excess heat may still be present in the turbine case 104. The active cooling control schedule adjustment can account for these variations through the use of one or more lookup operations and tracking of system state information of the gas turbine engine 20.

At block 606, the controller 120 can operate the active clearance control system 100 according to an active cooling control schedule as modified by the active cooling control schedule adjustment. The controller 120 can control a state of the valve 114 to a selectively deliver the cooling flow 118 to the active clearance control cooling air supply 102. The active cooling control schedule may be active during later flight segments, such as cruise 218, while the active cooling control schedule adjustment may be active during earlier flight segments, such as start, take-off, and climb.

At block 608, the controller 120 can apply a decay function 402 to the active cooling control schedule adjustment to reduce an effect of the active cooling control schedule adjustment with respect to the active cooling control schedule. The decay function 402 can fade a modification effect on the active cooling control schedule by the active cooling control schedule adjustment over a period of time 404. The active cooling control schedule adjustment can operate the active clearance control system 100 after engine start (e.g., start event 210) through takeoff (e.g., end of takeoff 212) and climb (e.g., beginning of climb 214 and mid-climb 216) by operating the valve 114 to reduce a clearance between 110 the turbine blades 106 and the turbine case 104 during takeoff and climb. The decay function 402 can be non-linear and mirror an expected change in the clearance 110 over time to reduce the leakage path 112 while preventing rubbing between the turbine blades 106 and the turbine case 104.

At block 610, the controller 120 can resume operation of the active clearance control system 100 according to the active cooling control schedule based on an active cooling control condition being met. The active cooling control condition can be time based or flight-segment based, for example.

While the above description has described the flow process of FIG. 7 in a particular order, it should be appreciated that unless otherwise specifically required in the attached claims that the ordering of the steps may be varied.

The term "about" is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A gas turbine engine comprising:
a turbine section comprising a turbine case and a plurality of turbine blades within the turbine case; and
an active clearance control system comprising:
an active clearance control cooling air supply;
a valve coupled to the active clearance control cooling air supply; and
a controller configured to:
determine an active cooling control schedule adjustment based on a condition of the gas turbine engine, the condition comprising a starting condition at an engine start time, wherein the condition of the gas turbine engine is determined based on an elapsed time from a previous shutdown to starting the gas turbine engine as a power-off time to the starting condition;
operate the active clearance control system according to an active cooling control schedule as modified by the active cooling control schedule adjustment;
apply a decay function to the active cooling control schedule adjustment to reduce an effect of the active cooling control schedule adjustment with respect to the active cooling control schedule during a period of time after the engine start time through takeoff and climb, wherein the active cooling control schedule is adjusted based on a scaling factor determined by a look-up table stored in a memory of the controller that estimates an expected reduction in heat during the power-off time and an expected addition of heat during a power-on time since the gas turbine engine was started to a current time, and the decay function fades out the active cooling control schedule adjustment and mirrors an expected change in a clearance between the turbine case and turbine blades over the period of time; and
resume operating the active clearance control system according to the active cooling control schedule based on an active cooling control condition being met.

2. The gas turbine engine of claim 1, wherein the starting condition is based on determining an ambient temperature.

3. The gas turbine engine of claim 1, wherein the controller is configured to control a state of the valve to selectively deliver a cooling airflow to the active clearance control cooling air supply.

4. The gas turbine engine of claim 1, wherein the active cooling control schedule adjustment operates the active clearance control system after engine start through takeoff and climb.

5. The gas turbine engine of claim 4, wherein the active cooling control schedule adjustment operates the valve to reduce the clearance between the turbine blades and the turbine case during takeoff and climb.

6. A method comprising:
determining an active cooling control schedule adjustment of an active clearance control system based on a condition of a gas turbine engine, the condition comprising a starting condition at an engine start time, wherein the condition of the gas turbine engine is determined based on an elapsed time from a previous shutdown to starting the gas turbine engine as a power-off time to the starting condition;
operating the active clearance control system according to an active cooling control schedule as modified by the active cooling control schedule adjustment;
applying a decay function to the active cooling control schedule adjustment to reduce an effect of the active cooling control schedule adjustment with respect to the active cooling control schedule during a period of time after the engine start time through takeoff and climb, wherein the active cooling control schedule is adjusted based on a scaling factor determined by a look-up table stored in a memory of a controller that estimates an expected reduction in heat during the power-off time and an expected addition of heat during a power-on time since the gas turbine engine was started to a current time, and the decay function fades out the active cooling control schedule adjustment and mirrors an expected change in a clearance between a turbine case and a plurality of turbine blades over the period of time; and
resuming operation of the active clearance control system according to the active cooling control schedule based on an active cooling control condition being met.

7. The method of claim 6, wherein the starting condition is based on determining an ambient temperature.

8. The method of claim 6, further comprising:
controlling a state of a valve to selectively deliver a cooling airflow to the active clearance control cooling air supply of an active clearance control system proximate to the turbine case of the gas turbine engine.

9. The method of claim 6, wherein the active cooling control schedule adjustment operates the active clearance control system after engine start through takeoff and climb.

10. The method of claim 9, wherein the active cooling control schedule adjustment reduces the clearance between the plurality of turbine blades and the turbine case of the gas turbine engine during takeoff and climb.

11. An active clearance control system comprising:
an active clearance control cooling air supply;
a valve coupled to the active clearance control cooling air supply; and
a controller configured to:
determine an active cooling control schedule adjustment based on a condition of a gas turbine engine, the condition comprising a starting condition at an engine start time, wherein the condition of the gas turbine engine is determined based on an elapsed time from a previous shutdown to starting the gas turbine engine as a power-off time to the starting condition;
operate the active clearance control system according to an active cooling control schedule as modified by the active cooling control schedule adjustment;
apply a decay function to the active cooling control schedule adjustment to reduce an effect of the active cooling control schedule adjustment with respect to the active cooling control schedule during a period of time after the engine start time through takeoff and climb, wherein the active cooling control schedule is adjusted based on a scaling factor determined by a look-up table stored in a memory of the controller that estimates an expected reduction in heat during the power-off time and an expected addition of heat during a power-on time since the gas turbine engine was started to a current time, and the decay function fades out the active cooling control schedule adjustment and mirrors an expected change in a clearance between a turbine case and a plurality of turbine blades over the period of time; and
resume operating the active clearance control system according to the active cooling control schedule based on an active cooling control condition being met.

12. The active clearance control system of claim 11, wherein the starting condition is based on determining an ambient temperature.

13. The active clearance control system of claim 11, wherein the controller is configured to control a state of the valve to selectively deliver a cooling airflow to the active clearance control cooling air supply.

14. The active clearance control system of claim 11, wherein the active cooling control schedule adjustment operates the active clearance control system after engine start through takeoff and climb.

15. The active clearance control system of claim 14, wherein the active cooling control schedule adjustment operates the valve to reduce the clearance between the turbine case and the plurality of turbine blades during takeoff and climb.

* * * * *